(12) United States Patent
Capobianco, Jr.

(10) Patent No.: US 10,656,623 B2
(45) Date of Patent: May 19, 2020

(54) ADDITIVE MANUFACTURING EVALUATION SYSTEMS AND METHODS

(71) Applicant: The United States of America as represented by the Secretary of the Navy, Crane, IN (US)

(72) Inventor: Vincent John Capobianco, Jr., Laguna Niguel, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 543 days.

(21) Appl. No.: 15/079,178

(22) Filed: Mar. 24, 2016

(65) Prior Publication Data

US 2016/0282850 A1    Sep. 29, 2016

Related U.S. Application Data

(60) Provisional application No. 62/137,351, filed on Mar. 24, 2015.

(51) Int. Cl.
   *G05B 19/4099* (2006.01)

(52) U.S. Cl.
   CPC ............... *G05B 19/4099* (2013.01); *G05B 2219/49023* (2013.01)

(58) Field of Classification Search
   CPC .............. G05B 19/4099; G05B 2219/49023
   USPC ........................................................ 700/118
   See application file for complete search history.

(56) References Cited

U.S. PATENT DOCUMENTS

| | | | |
|---|---|---|---|
| 6,542,249 B1 | 4/2003 | Kofman et al. | |
| 7,590,497 B2 | 9/2009 | Tornquist et al. | |
| 7,950,849 B2 | 5/2011 | Claus et al. | |
| 8,189,889 B2 | 5/2012 | Pearlstein et al. | |
| 8,598,523 B2 | 12/2013 | Stecker et al. | |
| 9,031,314 B2 | 5/2015 | Clausen et al. | |
| 9,216,603 B1 | 12/2015 | Mizes et al. | |
| 9,803,966 B2 * | 10/2017 | Pettersson | G01B 21/04 |
| 2010/0174392 A1 | 7/2010 | Fink et al. | |
| 2011/0029114 A1 | 2/2011 | Rose et al. | |
| 2014/0156051 A1 | 6/2014 | Miguel | |
| 2014/0277659 A1 | 9/2014 | Kumar et al. | |
| 2015/0123320 A1 * | 5/2015 | Joyce | B29C 64/386 |
| | | | 264/401 |
| 2015/0170416 A1 | 6/2015 | McGregor et al. | |

(Continued)

FOREIGN PATENT DOCUMENTS

WO    WO 2015/065483 A1    5/2015

OTHER PUBLICATIONS

Coste, Darren, 3D Printer Calibration Test, downloaded from the Internet on Dec. 28, 2015, http://www.cgtrader.com/free-3d-print-models/hobby-diy/other/3d-printer-calibration-test-part; 3pages.

(Continued)

*Primary Examiner* — James J Lee
*Assistant Examiner* — Christopher W Carter
(74) *Attorney, Agent, or Firm* — Naval Surface Warfare Center, Crane Division

(57) ABSTRACT

A system is configured to determine the calibration accuracy of an additive manufacturing machine for each of fourteen (14) geometric dimensioning and tolerancing parameters. The system also allows for the comparison of the calibration accuracy of multiple additive manufacturing machines.

6 Claims, 12 Drawing Sheets

| Geometric Parameter (in.) | AM Machine #1 | AM Machine #2 | AM Machine #3 |
|---|---|---|---|
| Flatness | 0.0024 | 0.0022 | 0.0020 | 0.0021 |
| Circularity | 0.0106 | 0.0092 | 0.0067 | 0.0044 |
| Position | 0.0028 | 0.0025 | 0.0180 | 0.0031 |
| Perpendicularity | 0.0036 | 0.0037 | 0.0062 | 0.0028 |

(56) References Cited

U.S. PATENT DOCUMENTS

2015/0177158 A1 6/2015 Cheverton
2015/0352794 A1 12/2015 Nguyen et al.

OTHER PUBLICATIONS

Moylan, Shawn, et al, "*An additive manufacturing test artifact*", Journal of Research of the National Institute of Standards and Technology, 119.1, Jan. 2014-Feb. 2014: 429(31); 23 pages.
Chowdary, Boppana V., et al., "*An investigation for improvement of the 3D-digitization process: a reverse engineering approach*", Journal of Research of the National Institute of Standards and Technology, 22.1; 2011: 131-147; 10 pages.
Johnson, Wayne M, et al. "*Comparative evaluation of an open-source FDM system*", Rapid Protyping Journal 20.3 (2014): 2015-214; 10 pages.
Hipolite, Whitney, Shaker Vibration System, Designer Creates an All-in-One Solution for Testing & Calibrating Your 3D Printer, Mar. 5, 2015, 3D Design/3D Printing; downloaded from the Internet on Dec. 27, 2015 http://3dprint.com/48922/3d-printer-calibrating-test/; 12 pages.

\* cited by examiner

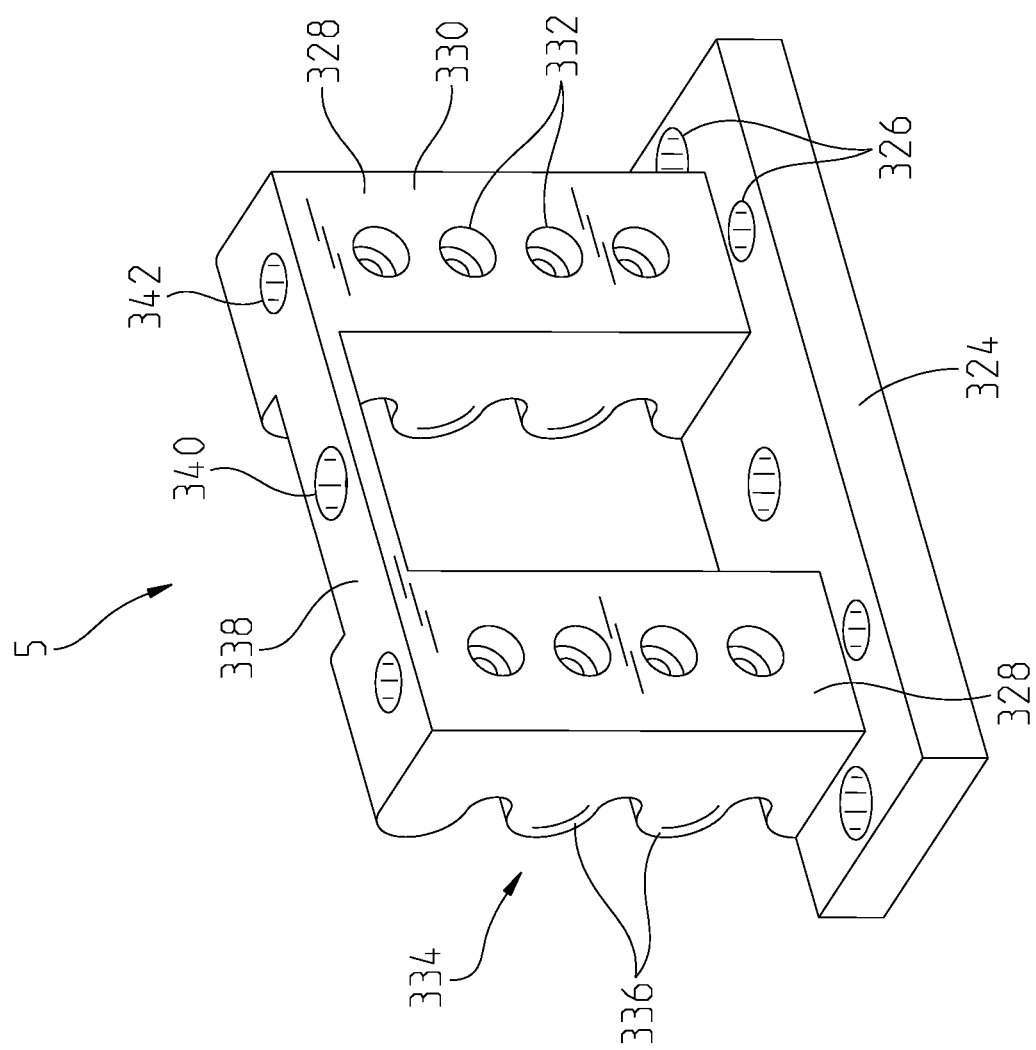

ADDITIVE MANUFACTURING EVALUATION SYSTEMS AND METHODS

CROSS-REFERENCE TO RELATED APPLICATIONS

The present application claims priority to U.S. Provisional Patent Application Ser. No. 62/137,351, filed Mar. 24, 2015, and entitled "ADDITIVE MANUFACTURING EVALUATION SYSTEMS AND METHODS," the complete disclosure of which is expressly incorporated by reference herein.

STATEMENT REGARDING FEDERALLY-SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,116) is assigned to the United States Government and is available for licensing for commercial purposes. Licensing and technical inquiries may be directed to the Technology Transfer Office, Naval Surface Warfare Center Corona Division, email: CRNA_CTO@navy.mil.

BACKGROUND AND SUMMARY OF THE INVENTION

Additive manufacturing (AM) methods may be used to form a variety of components from various materials. More particularly, AM methods produce a three-dimensional (3D) component(s) by adding materials to each other according to a model or other data for the component. For example, one type of AM method is 3D printing which allows a variety of components to be formed, most frequently, from polymeric and/or metallic materials, in a layering or other deposition-type process. Other types of AM methods are direct metal laser sintering, electron beam melting, fused deposition modeling, select laser sintering, and stereolithography. AM methods are in contrast to subtractive manufacturing methods, such as machining, which form a component by the removal of material.

Using AM methods, a component is able to be created in situ and rapidly once the need for a component arises. AM methods may eliminate the need to order and ship certain components, which allows for rapid response to a desired need for a certain component. Additionally, AM methods may allow for the formation of more than one component during a single use or operation of an AM machine (e.g., 3D printer).

However, it may be difficult or not possible to evaluate the accuracy or geometric reproducibility performance of an AM machine.

The present disclosure relates to an AM method and system for evaluating the accuracy and performance of an AM machine over time. According to an illustrative embodiment of the present disclosure, the method and system of the present application includes a plurality of evaluation processes that address Geometric Dimensioning & Tolerancing (GD&T) parameters, for example the standards from the American Society of Mechanical Engineers (ASME) Y14.5, utilized during the formation of a component. GD&T defines and communicates engineering tolerances using symbols on engineering drawings and in computer-generated models. Using GD&T parameters, people and machines can determine the degree of accuracy and precision needed for each portion of a component or device being formed, for example through AM methods.

In one embodiment of the present disclosure, a method of determining the calibrated accuracy of an additive manufacturing (AM) machine comprises providing a computing device having software, a memory, and a controller, operably coupling the AM machine to the computing device, generating a first data file for a first reference standard article on the computing device, transmitting the first data file to the AM machine, and transmitting a first coordinate location on a build plate of the AM machine from the computing device to the AM machine. Additionally, method comprises forming, by the AM machine, the first reference standard article at the first coordinate location on the build plate. The method also comprises providing an evaluation device for the first reference standard article. The method further comprises evaluating, by the evaluation device, each surface of the first reference standard article. Additionally, the method comprises transmitting data from the evaluation device about the first reference standard article to the computing device and generating an output on the computing device with conclusions about the calibrated accuracy of the AM machine based on the data from the evaluation device about each surface of the first reference standard article.

In a further embodiment of the present disclosure, a system for determining the calibrated accuracy of an additive manufacturing (AM) machine comprises a build plate of the AM machine including a plurality of coordinate positions and a materials interface of the AM machine configured to deposit material at any of the plurality of coordinate positions on the build plate to form at least one of a first reference standard article at a first coordinate position of the build plate, a second reference standard article at a second coordinate position of the build plate, a third reference standard article at a third coordinate position of the build plate, and a fourth reference standard article at a fourth coordinate position of the build plate. The system also comprises a computing device operably coupled to the AM machine and an evaluation device operably coupled to the computing device. The evaluation device is configured to measure a plurality of parameters of the first, second, third, and fourth reference standard articles. Additionally, the computing device is configured to provide an output about the calibrated accuracy of the AM machine based on the measured parameters of the first, second, third, and fourth reference standard articles.

In another embodiment of the present disclosure, a system for determining the calibrated accuracy of a first additive manufacturing (AM) machine and a second AM machine comprises a first build plate of the first AM machine including a plurality of coordinate positions and a first materials interface of the AM machine configured to deposit material at any of the plurality of coordinate positions on the first build plate to form at least one of a first reference standard article at a first coordinate position of the first build plate, a second reference standard article at a second coordinate position of the first build plate, a third reference standard article at a third coordinate position of the first build plate, and a fourth reference standard article at a fourth coordinate position of the first build plate. The system also comprises a second build plate of the second AM machine including the plurality of coordinate positions and a second materials interface of the second AM machine configured to deposit material at any of the plurality of coordinate positions on the second build plate to form at least one of the first reference standard article at a first coordinate position of the second build plate, the second reference standard article at a second coordinate position of the second build plate, the third reference standard article at a third coordinate position of the second build plate, and the fourth reference standard article at a fourth coordinate position of the second build plate. Additionally, the system comprises a computing device operably coupled to the first and second AM machines and an evaluation device operably coupled to the computing device. The evaluation device is configured to measure a plurality of parameters of the first, second, third, and fourth reference standard articles. The computing device is configured to provide an output about the calibration accuracy of the first and second AM machines based on the measured parameters of the first, second, third, and fourth reference standard articles formed by the first and second AM machines. Additionally, the computing device is configured to provide a comparison output comparing the output about the calibrated accuracy of the first AM machine and the output about the calibrated accuracy of the second AM machine.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 1C is a perspective view of a first side of a third reference standard article of the present disclosure formed by the AM machine;

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 9:
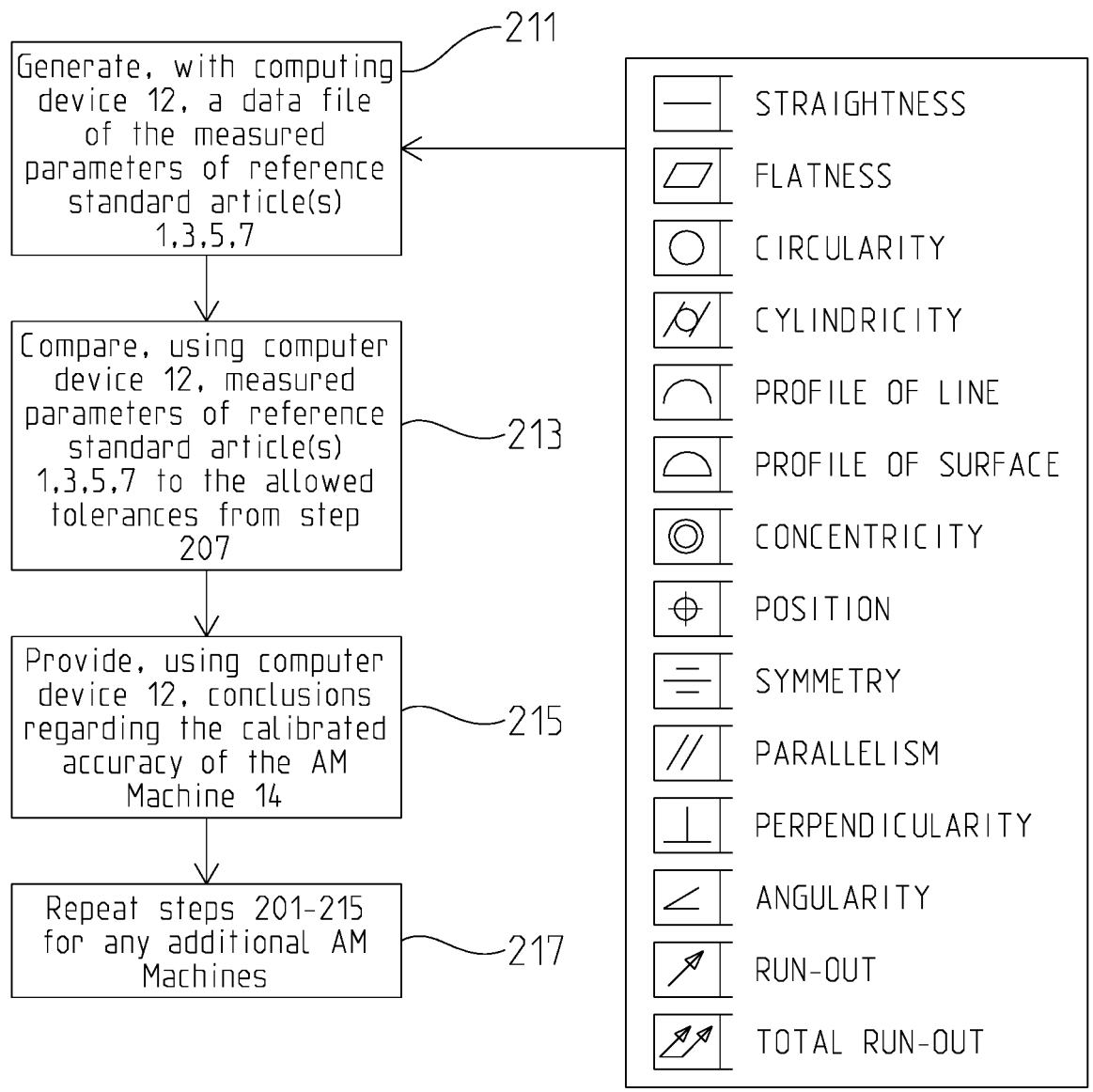
FIG. 9 is a flow chart of a second portion of steps of the illustrative method.

The present disclosure relates to a method and system for evaluating the calibrated accuracy of an additive manufacturing (AM) machine or manufacturing equipment, such as a three-dimensional (3D) printer, direct metal laser sintering machine, electron beam melting machine, a fused deposition modeling machine, a select laser sintering machine, and a stereolithography machine. More particularly, when an AM machine is used to form a component, object, or device, it is expected that the AM machine will form the component, object, or device within the predetermined and accepted tolerances for each of the different geometric dimensioning and tolerancing (GD&T) parameters for that device, for example the allowed tolerances according to the American Society of Mechanical Engineers (ASME) Y14.5 standards. The ASME Y14.5 include fourteen (14) different GD&T parameters, such as straightness, flatness, circularity, cylindricity, profile of a line, profile of a surface, perpendicularity, angularity, parallelism, symmetry, position, concentricity, circular run-out, and total run-out, as shown in FIG. 9, which are used to evaluate whether a component or object has been formed within standard tolerances according to the calibration of the AM machine.

Figure 2:
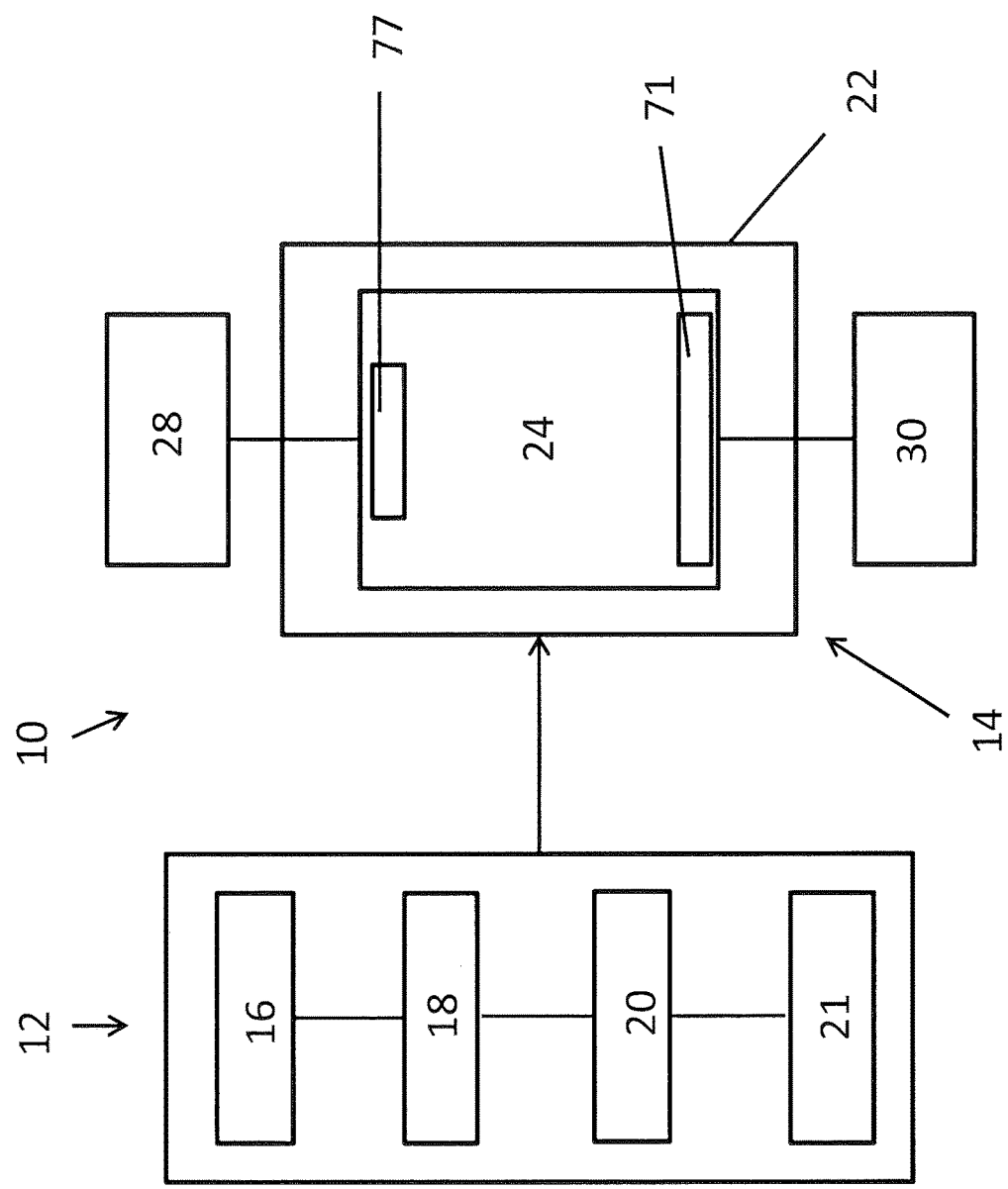
FIG. 2 is a schematic view of a system of the present disclosure which includes a computing device and the AM machine.

In order to evaluate whether an AM machine is correctly calibrated to output components or objects within the standard tolerances, the present disclosure relates to a method and a system 10 for evaluating the performance of an AM machine 14 (FIG. 2). For example, if the calibration for AM machine 14 is no longer accurate, for example due to machine wear over time, the method and system 10 (FIG. 2) of the present disclosure is configured to determine which of the fourteen GD&T parameters are inaccurate for AM machine 14. Additionally, the present disclosure allows for assessment of the ability of AM machine 14 with respect to form, fit, and function of any component formed by AM machine 14. In this way, the present disclosure allows for a complete and total assessment of the total geometry of a component formed by AM machine 14.

Figure 1B:
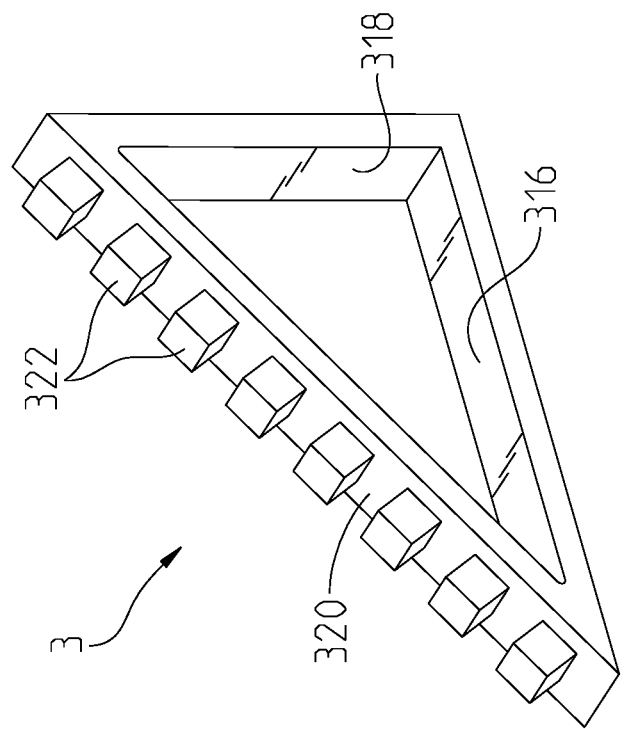
FIG. 1B is a perspective view of a second reference standard article of the present disclosure formed by the AM machine.
Figure 1A:
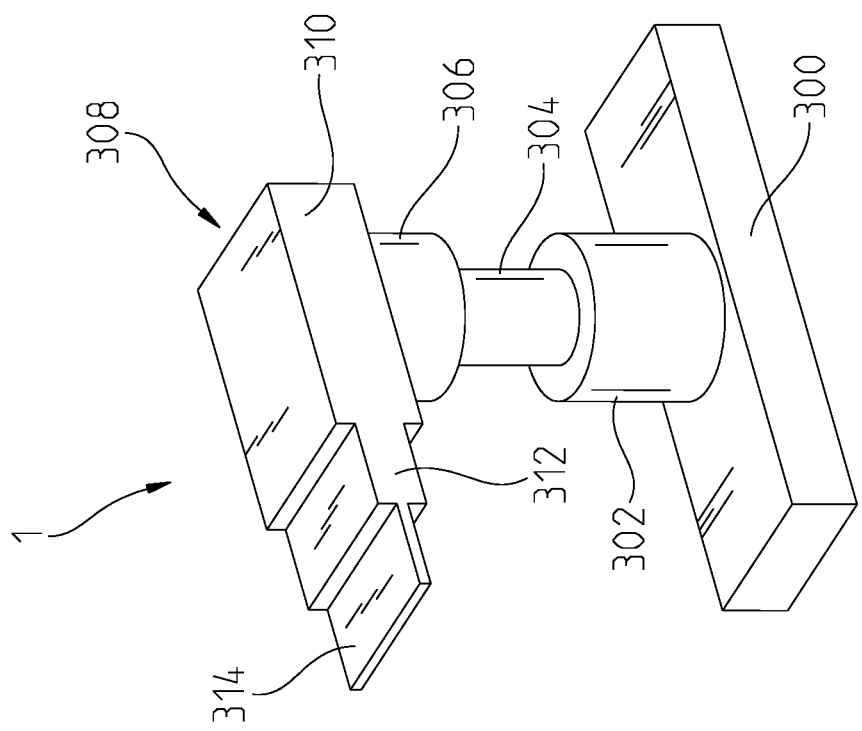
FIG. 1A is a perspective view of a first reference standard article of the present disclosure formed by an additive manufacturing (AM) machine.
Figure 1E:
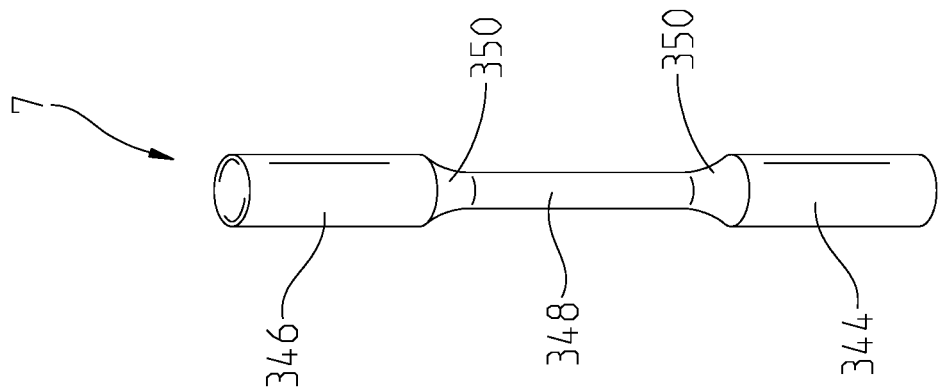
FIG. 1E is a perspective view of a fourth reference standard article of the present disclosure formed by the AM machine.
Figure 1D:
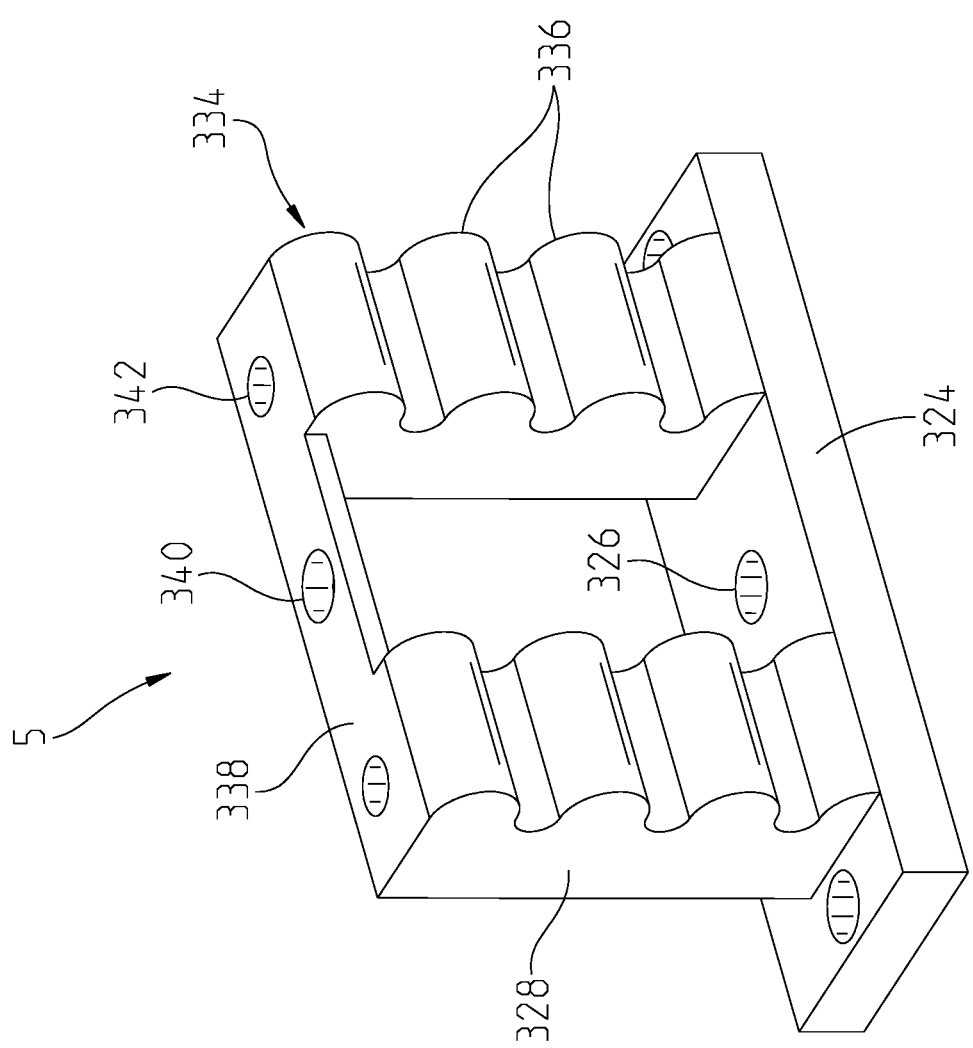
FIG. 1D is a perspective view of a second side of the third reference standard article of FIG. 1C.

With reference to FIGS. 1A-D and 2, system 10 of the present disclosure (FIG. 2) is configured to produce a plurality of reference standard articles to measure the calibration accuracy of AM machine 14. Illustratively, system 10 of the present disclosure is configured to produce four reference standard articles, including a first reference standard article 1 (FIG. 1A), a second reference standard article 3 (FIG. 1B), a third reference standard article 5 (FIG. 1C), and a fourth reference standard article 7 (FIG. 1D). Each of reference standard articles 1, 3, 5, 7 allows different features of AM machine 14 to be evaluated. More particularly, the configuration of the different angles, surfaces, and proportions of reference standard articles 1, 3, 5, 7 test the AM machine's capabilities with respect to the fourteen GD&T parameters.

For example, first reference standard article 1 (FIG. 1A) is configured with a variety of angles and surfaces which determine the AM machine's ability to correctly meet at least the circularity and perpendicularity tolerances, according to the GD&T parameters. More particularly, first reference standard article 1 includes a rectangular base 300, a first cylindrical support portion 302, a second cylindrical support portion 304, a third cylindrical support portion 306, and a rectangular upper portion 308 which is generally cantilevered from support portions 302, 304, 306 and includes a first rectangular upper portion 310, a second rectangular upper portion 312, and a third rectangular upper portion 314. Base 300 and upper portion 308 each have a generally rectangular shape and may be formed to determine if AM machine 14 is properly calibrated with respect to at least straightness, flatness, profile of surface, position, parallelism, perpendicularity, and/or total run-out. Additionally, cylindrical portions 302, 304, 306 each have a generally circular shape and may be formed to determine if AM machine 14 is properly calibrated with respect to at least circularity, profile of a surface, concentricity, position, symmetry, circular run-out, and/to total run-out. As such, if AM machine 14 incorrectly forms reference standard article 1 with dimensions and proportions which are not within the standard tolerances for at least some or all of these GD&T parameters, for example by forming two surfaces at an 80-degree angle instead of a 90-degree angle when the tolerance is only 2 degrees, then such measurements will indicate that AM machine 14 is no longer correctly calibrated for at least certain GD&T parameters.

Additionally, and referring to FIG. 1B, the configuration of second reference standard article 3 includes surfaces and angles which may determine the AM machine's capabilities with respect to at least straightness, flatness, profile of a line, perpendicularity, angularity, parallelism, and/or symmetry. More particularly, second reference standard article 3 includes a generally rectangular base 316, a generally rectangular upright support member 318, a generally rectangular ramped support member 320, and a plurality of generally rectangular or cube protrusions 322 extending from ramped support member 320. As such, the configuration of base 316, upright support member 318, ramped support member 320, and protrusions 322 may be configured to determine if AM machine 14 is properly calibrated with respect to at least straightness, flatness, profile of a line, perpendicularity, angularity, parallelism, and/or symmetry.

The configuration of third reference standard article 5 shown in FIGS. 1C and 1D includes surfaces and angles which may determine the AM machine's capabilities with respect to at least straightness, flatness, circularity, profile of a line, profile of a surface, perpendicularity, position, concentricity, circular run-out, and total run-out. More particularly, third reference standard article 5 includes a generally rectangular base 324 which includes a plurality of openings or recesses 326, upright support members 328 each of which has a first face 330 which has a plurality of openings or recesses 332 and a second face 334 which has a plurality of rounded or arcuate protrusions 336, and a generally rectangular upper portion 338 which includes a first opening or recess 340 and second openings or recesses 342. In one embodiment, base 324 and upper portion 338 each have a generally rectangular configuration and may determine if AM machine 14 is properly calibrated with respect to at least straightness, flatness, profile of a line, profile of a surface, perpendicularity, position, concentricity, run-out, and/or total run-out. Additionally, protrusions 336 and openings or recesses, 326, 332, 340, 342 may be formed on third reference standard article 5 to determine if AM machine 14 is properly calibrated with respect to at least profile of a surface, concentricity, position, circular run-out, and/or total run-out.

Lastly, the configuration of fourth reference standard article 7 shown in FIG. 1E includes angles and surfaces which may determine the AM machine's capabilities with respect to at least circularity, cylindricity, profile of a surface, symmetry, position, concentricity, and circular run-out. More particularly, fourth reference standard article 7 includes a first cylindrical portion 344, a second cylindrical portion 346, and a third cylindrical portion 348 which is coupled to or integral with first and second cylindrical portions 344, 346 through tapered portions 350. The cylindrical configuration of portions 344, 346, 348 and the rounded or angled configuration of tapered portions 350 may be configured to determine if AM machine 14 is properly calibrated with respect to at least circularity, cylindricity, profile of a surface, symmetry, position, concentricity, and/or circular run-out.

Therefore, because each of reference standard articles 1, 3, 5, 7 measures at least some of the 14 GD&T parameters, and in total reference standard articles 1, 3, 5, 7 measure all 14 GD&T parameters, it is possible to evaluate an AM machine's capability with respect to all 14 GD&T parameters by forming these four reference standard articles 1, 3, 5, 7 during a single operation of AM machine 14. Additionally, the ability of AM machine 14 with respect to the fit, form, and function of each reference standard article 1, 3, 5, 7 formed by AM machine 14 can be assessed.

Illustrative system 10 of the present disclosure is configured to evaluate the accuracy of AM machine 14 irrespective of the material with which or the environment in which any of reference standard articles 1, 3, 5, 7 are formed. Additionally, illustrative system 10 of the present disclosure allows for comparing the accuracy of various AM machines over a life cycle of the AM machines.

Referring to FIG. 2, illustrative system 10 includes a computing device 12 and AM machine 14. In one embodiment, computing device 12 includes software 16, a memory 18, a database or library 20, and a controller 21. Memory 18 may be configured as a non-transient computer readable storage medium. Controller 21 may be configured to control operation of software 16, memory 18, library 20, and/or AM machine 14 and also may be configured to receive and output information between computing device 12 and AM machine 14, as disclosed further herein. Functions of controller 21 may be performed by hardware and/or as computer-readable instructions on memory 18.

Software 16 may be a three-dimensional graphic design software, such as AUTOCAD® or SOLIDWORKS®, configured to allow a user at the location of AM machine 14 or a remote user to "draw" or otherwise generate a data file containing a 3D "sketch" and the parameters of articles 1, 3, 5, 7. The data file(s) may contain parameters such as the dimensions (height, width, length, radius, inner diameter, outer diameter, surface area, volume, density, etc.) of any or all of articles 1, 3, 5, 7, the type and quantity of material comprising articles 1, 3, 5, 7, any manufacturing parameters for forming articles 1, 3, 5, 7, and any other data or information necessary to form articles 1, 3, 5, 7.

In another embodiment, software 16 is not used to generate a data file for articles 1, 3, 5, 7, but rather, computing device 12 may be electrically coupled (through wireless signals or electrical hardwiring, lines, or other connections) to an external database (not shown) containing a plurality of data files for each article 1, 3, 5, 7. The database may be an external database and the data files therein may be uploaded to memory 18, for example through a USB or wireless connection. As such, memory 18 is configured to store a plurality of data files for articles 1, 3, 5, 7. Memory 18 also is configured to store any data files created by software 16. Controller 21 may cooperate with software 16 and/or memory 18 to transmit the data file to AM machine 14.

Alternatively, and as shown in FIG. 2, instead of obtaining a data file through software 16 or an external database as disclosed above, computing device 12 also may include an internal library or database 20 which contains a plurality of data files or information about each article 1, 3, 5, 7. Library 20 may transmit the data file(s) for articles 1, 3, 5, 7 to memory 18 for transmission to AM machine 14 through controller 21 or may directly transmit the data file to AM machine 14 by way of controller 21. While shown separately in FIG. 2, library 20 also may be contained within memory 18 of computing device 12.

Referring still to FIG. 2, the parameters needed to form articles 1, 3, 5, 7 may be obtained through any of the above-disclosed processes and are transmitted to AM machine 14 for the formation of article(s) 1, 3, 5, 7 to test the calibration accuracy of AM machine 14. AM machine 14 may be any type of additive manufacturing machine or equipment, such as a 3D printer, direct metal laser sintering machine, electron beam melting machine, a fused deposition modeling machine, a select laser sintering machine, and a stereolithography machine. In one embodiment, AM machine 14 may include support platform or build plate 71, a housing 22 formed around build plate 71, an operating chamber 24 positioned within at least a portion of housing 22, and at least one materials interface for providing the material for reference standard articles 1, 3, 5, 7. For example, illustratively, the materials interface may be a print head 77 coupled to housing 22 and extending into operating chamber 24 to provide material for forming any or all of articles 1, 3, 5, 7. Alternatively, for other types of AM manufacturing process, the materials interface also may be a laser mirror articulation interface for direct metal laser sintering processes. The materials interface also may be any other type of device or mechanism used for providing materials and/or forming any of reference standard articles 1, 3, 5, 7.

In one embodiment, AM machine 14 is operably coupled to or, alternatively, contains a first material supply 28 configured to supply a first material for forming articles 1, 3, 5, 7 to operating chamber 24. In one embodiment, the first material may be any polymeric or metallic material. Additionally, AM machine 14 may be operably coupled to or, alternatively, contain a second material supply 30 configured to supply a second material to operating chamber 24 to form a support portion 79 (FIG. 4) which supports at least a portion of any of articles 1, 3, 5, 7 during formation thereof. It may be appreciated that the second material is different from the first material and that any soluble material, such as a water-soluble material, may be used for supporting articles 1, 3, 5, 7 during formation thereof, for example the soluble materials disclosed in U.S. Pat. No. 6,780,403, the complete disclosure of which is expressly incorporated by reference herein.

Figure 3:
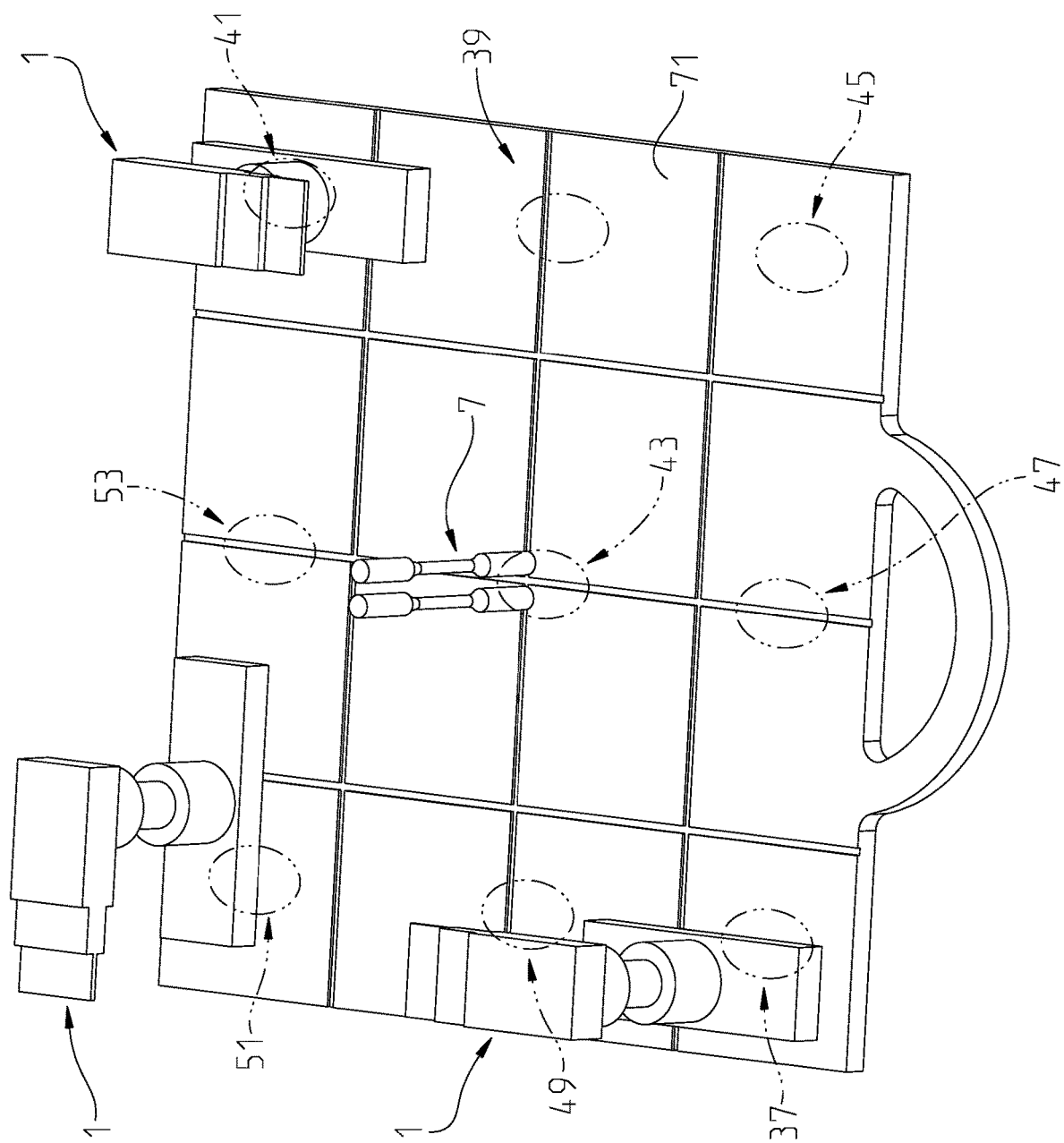
FIG. 3 is a perspective view of a build plate and a plurality of any of the first, second, third, and fourth reference standard articles of the system of FIG. 2.

Referring to FIG. 3, build plate 71 of AM machine 14 may include a grid pattern which corresponds to a plurality of coordinate locations thereof. Build plate 71 may be formed of a ceramic, metallic, and/or polymeric material. More particularly, a coordinate system may be applied to build plate 71 to identify various locations on build plate 71 on which at least one of reference standard articles 1, 3, 5, 7 may be built by AM machine 14 to determine the AM machine's capabilities with respect to at least the position parameter. Additional capabilities of AM machine 14 may be tested and evaluated by the formation of any of articles 1, 3, 5, 7 at various coordinate locations on build plate 71. For example, illustrative build plate 71 may include a plurality of predetermined positions or build locations for forming any of reference standard articles 1, 3, 5, 7 at these locations. In one embodiment, build plate 71 includes nine distinct predetermined coordinate positions 37, 39, 41, 43, 45, 47, 49, 51, 53 which are equally spaced apart from adjacent positions. Using a coordinate system as a guide, position 43 is positioned at the center point of build plate 71 which also may be identified as (0, 0, 0) in an x, y, z coordinate system. Additionally, position 39 may be identified as (1, 0, 0) in an x, y, z coordinate system, position 49 may be identified as (−1, 0, 0) in an x, y, z coordinate system, position 47 may be identified as (0, −1, 0) in an x, y, z coordinate system, position 53 may be identified as (0, 1, 0) in an x, y, z coordinate system, position 41 may be identified as (1, 1, 0) in an x, y, z coordinate system, position 51 may be identified as (−1, 1, 0) in an x, y, z coordinate system, position 37 may be identified as (−1, −1, 0) in an x, y, z coordinate system, and position 45 may be identified as (1, −1, 0) in an x, y, z coordinate system. As shown in FIG. 3, any number of reference standard articles 1, 3, 5, 7 may be formed at any of positions 37, 39, 41, 43, 45, 47, 49, 51, 53 to evaluate at least the position parameter of AM machine 14. Additionally, any of reference standard articles 1, 3, 5, 7 may be formed at any of positions 37, 39, 41, 43, 45, 47, 49, 51, 53.

Figure 4:
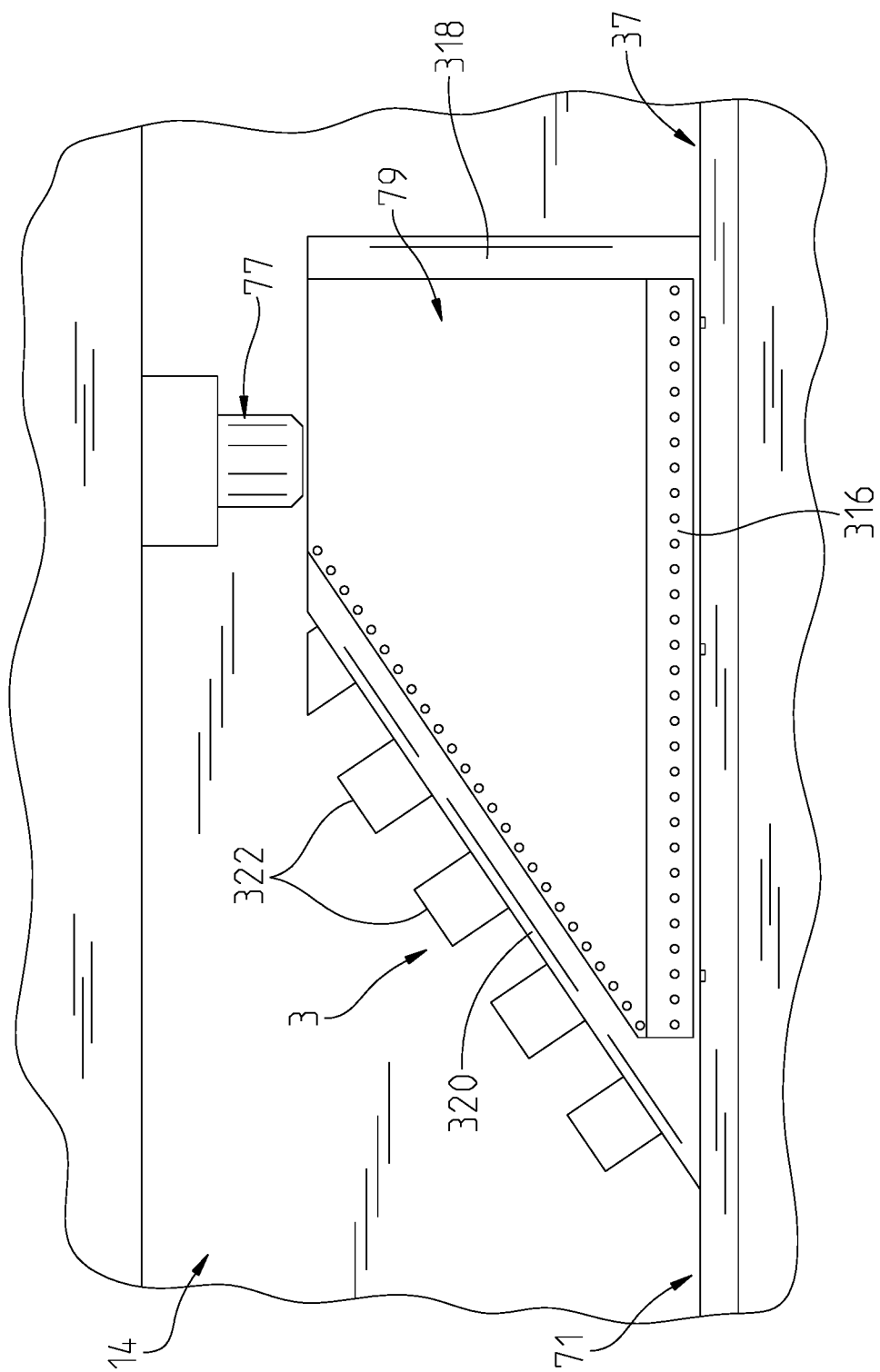
FIG. 4 is a side view of a portion of the AM machine and a portion of the second reference standard article being formed by the AM machine.

Referring to FIG. 4, and using second reference standard article 3 as an example, AM machine 14 is configured to form second reference standard article 3 according to the parameters and specifications received by AM machine 14 from computing device 12. More particularly, reference standard article 3 may be formed on any portion of build plate 71, for example at any of positions 37, 39, 41, 43, 45, 47, 49, 51, 53 or at any other location on build plate 71. Illustratively, AM machine 14 uses a fused deposition modeling process to form second reference standard article 3 by adding thin layers of the first material to each other to form second reference standard article 3, however, any other type of AM process may be used to form any of reference standard articles 1, 3, 5, 7. In one embodiment, first material supply 28 provides the first material to print head 77 to form second reference standard article 3 by depositing and fusing together a plurality of layers of the first material from print head 77 at a predetermined evaluation location of the build plate, e.g., location 37.

In one embodiment, to support at least a portion of second reference standard article 3 during formation, second material supply 30 may provide the second material to print head 77 or another materials interface (e.g., a second print head (not shown)) to form support portion 79 which supports or rigidifies at least a portion of second reference standard article 3 during formation thereof. In one embodiment, second material supply 30 may provide a soluble material to print head 77 such that support portion 79 may be removed through a water or chemical bath or spray after formation of second reference standard article 3 without affecting the first material comprising second reference standard article 3.

Figure 5:
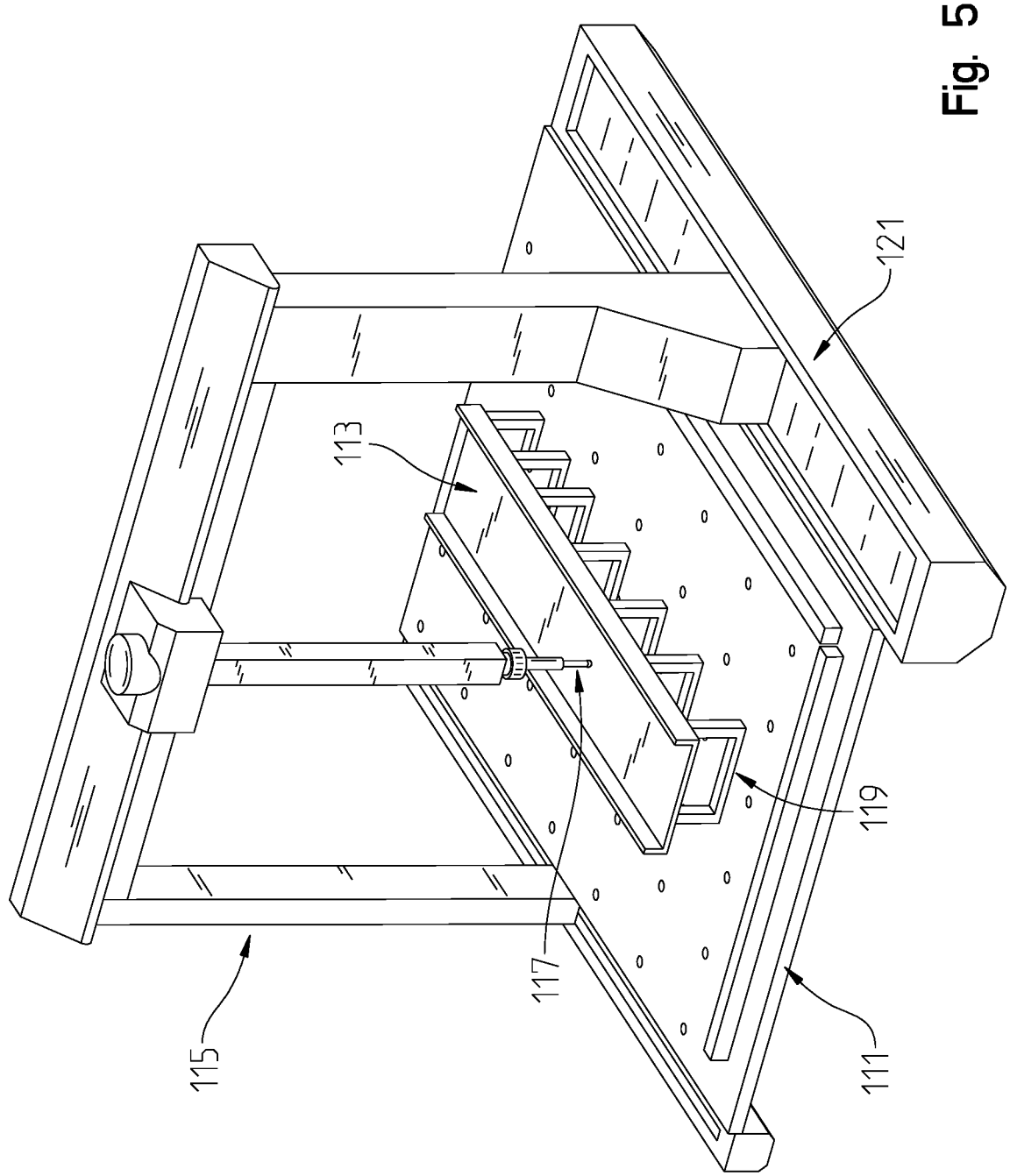
FIG. 5 is a perspective view of a coordinate measuring machine (CMM) of the system of FIG. 3 for evaluating any or all of the first, second, third, and fourth reference standard articles.

Referring to FIG. 5, once any or all of reference standard articles 1, 3, 5, 7 are formed with AM machine 14, the calibrated accuracy of AM machine 14 is evaluated to determine if articles 1, 3, 5, 7 are correctly formed within the predetermined allowed tolerances, as discussed above. More particularly, in order to understand if AM machine 14 is properly functioning and forming components correctly according to the 14 GD&T parameters, an evaluation device or machine, such as a coordinate measuring machine (CMM) 115, conducts a measurement process of the various surfaces of reference standard articles 1, 3, 5, 7 to determine if AM machine 14 is correctly calibrated for straightness, flatness, circularity, cylindricity, profile of a line, profile of a surface, position, symmetry, parallelism, perpendicularity, angularity, run-out, and total run-out. In one embodiment, CMM 115 includes a base plate 111 supported on base members 121, a measurement plate 113 supported on base plate 111 through supports 119, and a contact resistance probe 117 to make contact with a part or component positioned on measurement plate 113. In this way, CMM 115 is configured to contact the surfaces of the component on measurement plate 113 (e.g., any of reference standard articles 1, 3, 5, 7) with contact resistance probe 117 to determine the measurements and other parameters of each surface of reference standard articles 1, 3, 5, 7 or any other component formed with AM machine 14. For example, by moving contact resistance probe 117 along each surface of any of articles 1, 3, 5, 7, contact resistance probe 117 can determine the straightness, flatness, circularity, cylindricity, profile of a line, profile of a surface, position, symmetry, parallelism, perpendicularity, angularity, run-out, and total run-out of each surface of articles 1, 3, 5, 7 which allows the calibrated accuracy of AM machine 14 to be evaluated. The measurements obtained by contact resistance probe 117 can be compared to the allowed measurements and tolerances for articles 1, 3, 5, 7 to determine if AM machine 14 is producing components within the allowed tolerances. If AM machine 14 is correctly calibrated, then no further analysis may be performed. Conversely, if AM machine 14 incorrectly produced any of articles 1, 3, 5, 7 outside of the allowed tolerances, then AM machine 14 may be repaired and/or recalibrated to ensure accurate components are formed with AM machine 14 during future operations of AM machine 14.

Figure 6:
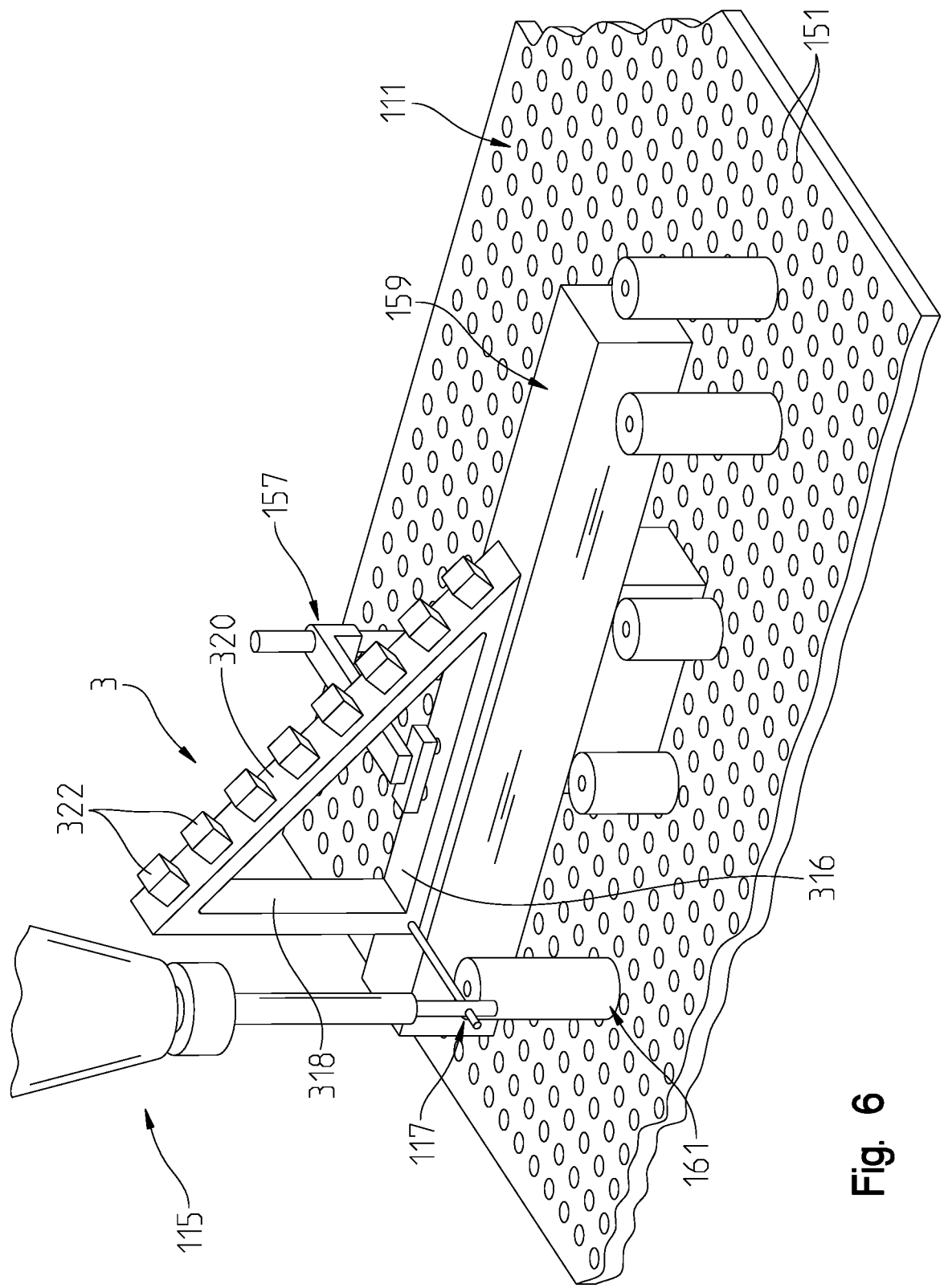
FIG. 6 is a perspective view of an alternative embodiment of the CMM of FIG. 5.

Referring to FIG. 6, in one embodiment of CMM 115, clamps 157 may be used to secure reference standard articles 1, 3, 5, 7 (illustratively, second reference standard article 3) to a portion of measurement plate 113 (FIG. 5) to perform the evaluation process with contact resistance probe 117. Alternatively, measurement plate 113 may be replaced with a smaller surface, such as a surface 159 for performing the evaluation of second reference standard article 3 with CMM 115. Additionally, supports 161 may be used with surface 159 to maintain the proper position of surface 159 during the measurement process of contact resistance probe 117. In one embodiment, supports 161 have a threaded base (not shown) which thread into a plurality of threaded openings 151 on base plate 111 of CMM 115. Supports 161 may surround at least a portion of surface 159 to prevent surface 159 from moving when contact resistance probe 117 contacts the surfaces of any of reference standard articles 1, 3, 5, 7.

Figure 7:
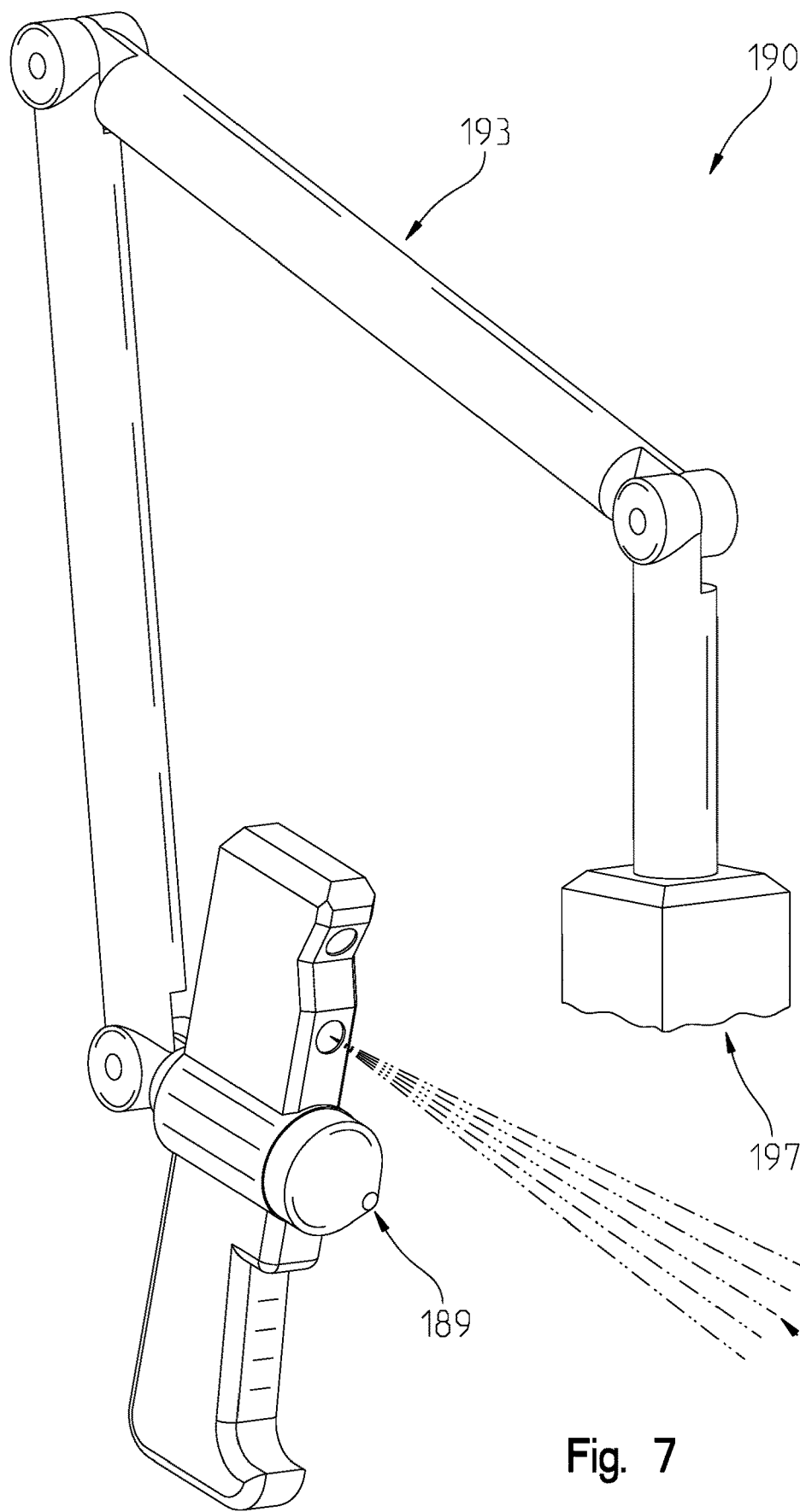
FIG. 7 is a perspective view of a laser scanning machine of the system of FIG. 3 for evaluating any or all of the first, second, third, and fourth reference standard articles.

Alternatively, and referring to FIG. 7, a different evaluation device or machine, such as a laser scanning machine 190, may be used to evaluate and analyze any of reference standard articles 1, 3, 5, 7 formed by AM machine 14 to evaluate the calibration accuracy of AM machine 14. In one embodiment, laser scanning machine 190 includes a laser scanning arm 193 that emits a laser beam 195 upon a part (e.g., reference standard articles 1, 3, 5, 7) fixed in location. Laser scanning arm 193 articulates around a base 197 and may also have a contact resistance probe 189. In this way, laser scanning machine 190 is configured to measure the various surfaces of any of reference standard articles 1, 3, 5, 7 with laser beam 195 and/or contact resistance probe 189 to determine if AM machine 14 is correctly calibrated for straightness, flatness, circularity, cylindricity, profile of a line, profile of a surface, position, symmetry, parallelism, perpendicularity, angularity, run-out, and total run-out. If AM machine 14 correctly forms any of articles 1, 3, 5, 7 within the predetermined allowed tolerances noted above, then it is determined that AM machine 14 is correctly calibrated. Conversely, if AM machine 14 incorrectly forms any of articles 1, 3, 5, 7 outside of the allowed tolerances, then this indicates that AM machine 14 may need to be repaired and/or recalibrated before future use.

In one embodiment, the results of laser scanning machine 190 and/or CMM 115 can be used to produce a data model (not shown) with color gradients signifying the correct and/or incorrect surfaces on any of reference standard articles 1, 3, 5, 7. For example, if the data files or charts generated from use of laser scanning machine 190 result in a red color on a portion of reference standard articles 1, 3, 5, 7, then this area may be outside of the allowed tolerance and a measurement may indicate the exact parameters for this surface to identify which of the calibration parameters AM machine 14 are incorrectly calibrated. However, if the data files or charts generated from use of laser scanning machine 190 result in a green color on a portion of reference standard articles 1, 3, 5, 7, then this area may be within the allowed tolerance and a measurement may indicate the exact parameters for this surface to identify which of the calibration parameters AM machine 14 are correctly calibrated. A gradient of colors between red and green also may be provided in a data chart or file to indicate the parameters of all other surfaces on reference standard articles 1, 3, 5, 7 relative to the allowed tolerances. In this way, the data file may indicate which of the 14 GD&T parameters are incorrectly and correctly calibrated on AM machine 14.

Figure 8:
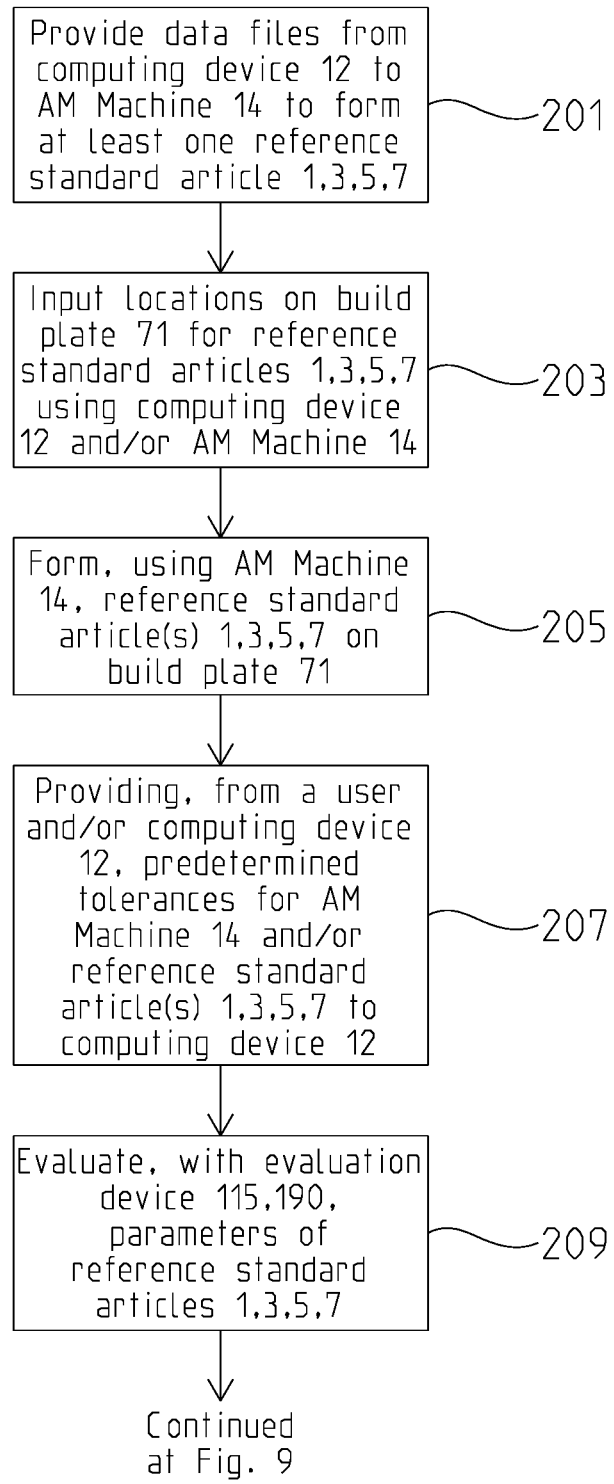
FIG. 8 is a flow chart of a first portion of steps of an illustrative method of the system of FIG. 3.

FIGS. 8 and 9 show an exemplary block diagram depicting an illustrative method of determining the calibration accuracy of AM machine 14. For example, in one embodiment, the method includes Step 201 which provides data files or data information from computing device 12 to AM machine 14 to form at least one of reference standard articles 1, 3, 5, 7. Next, at Step 203, either computing device 12 and/or a user of AM machine 14 inputs the location(s) on build plate 71 at which any or all of references standard articles 1, 3, 5, 7 are to be formed. Next, at Step 205, any or all of reference standard articles 1, 3, 5, 7 are formed on build plate 71 using AM machine 14. Following Step 205, the method continues to Step 207 which provides predetermined allowed tolerances for AM machine 14 and/or reference standard articles 1, 3, 5, 7, according to any predetermined and accepted standards, such as ASME STD Y14.5 standards, to computing device 12. The GD&T parameters may be provided to computing device 12 through any type of wired or wireless connection. However, if computing device 12 already contains the predetermined and allowed tolerances and parameter data for AM machine 14 and/or articles 1, 3, 5, 7, then Step 207 may be skipped. Next, at Step 209, the surfaces of reference standard articles 1, 3, 5, 7 are measured and/or otherwise evaluated. For example, in one embodiment, CMM 115 may be used to determine the parameters of each surface of reference standard articles 1, 3, 5, 7 with contact resistance probe 117. Alternatively, laser scanning machine 190 may be used to evaluate the surfaces of reference standard articles 1, 3, 5, 7 with laser beam 195 and/or contact resistance probe 189. Referring next to Step 211 (FIG. 8), a data file, chart, table, or any other file or output is created on computing device 12 with the measured parameters of reference standard articles 1, 3, 5, 7 from CMM 115 and/or laser scanning machine 190. The data file output may contain a specific analysis of each of the 14

GD&T parameters that are applicable to each reference standard article 1, 3, 5, 7 or the data file may contain raw data measurements collected from laser scanning machine 190 or CMM 115 which are later analyzed in the context of the 14 GD&T parameters. Such an analysis may be done by an operator of AM machine 14 and/or may be performed by computing device 12. Next, at Step 213, the measured parameters of reference standard articles 1, 3, 5, 7 obtained from CMM 115 and/or laser scanning machine 190 may be compared to the allowed and predetermined tolerances for AM machine 14 and/or reference standard articles 1, 3, 5, 7 obtained in Step 207. The comparison performed in Step 213 may yield a color chart, as previously disclosed, or any other data file, such as that shown in FIG. 9, to identify if any of the measured parameters for the surfaces of reference standard articles 1, 3, 5, 7 are outside of the allowed tolerances. Following Step 213, Step 215 outputs a conclusion about the calibrated accuracy of AM machine 14. More particularly, the outputted conclusions formed in Step 215 may provide a specific analysis of each of the 14 GD&T parameters to determine which, if any, of the GD&T parameters are incorrectly calibrated on AM machine 14. In this way, Step 215 results in a recommendation or conclusion for repairs and/or recalibration of AM machine 14 if any of the 14 GD&T parameters are determined to be outside of the allowed tolerances. These recommendations or conclusions may be provided directly to an operator of AM machine 14 and/or to computing device 12. Lastly, the method of the present disclosure may end with Step 217 in which Steps 201-215 may be repeated for any additional AM machines to determine the calibrated accuracy of those additional AM machines. The different data for each AM machine 14 may be compared with each other to determine which AM machines 14 may need to be recalibrated.

Figure 10:
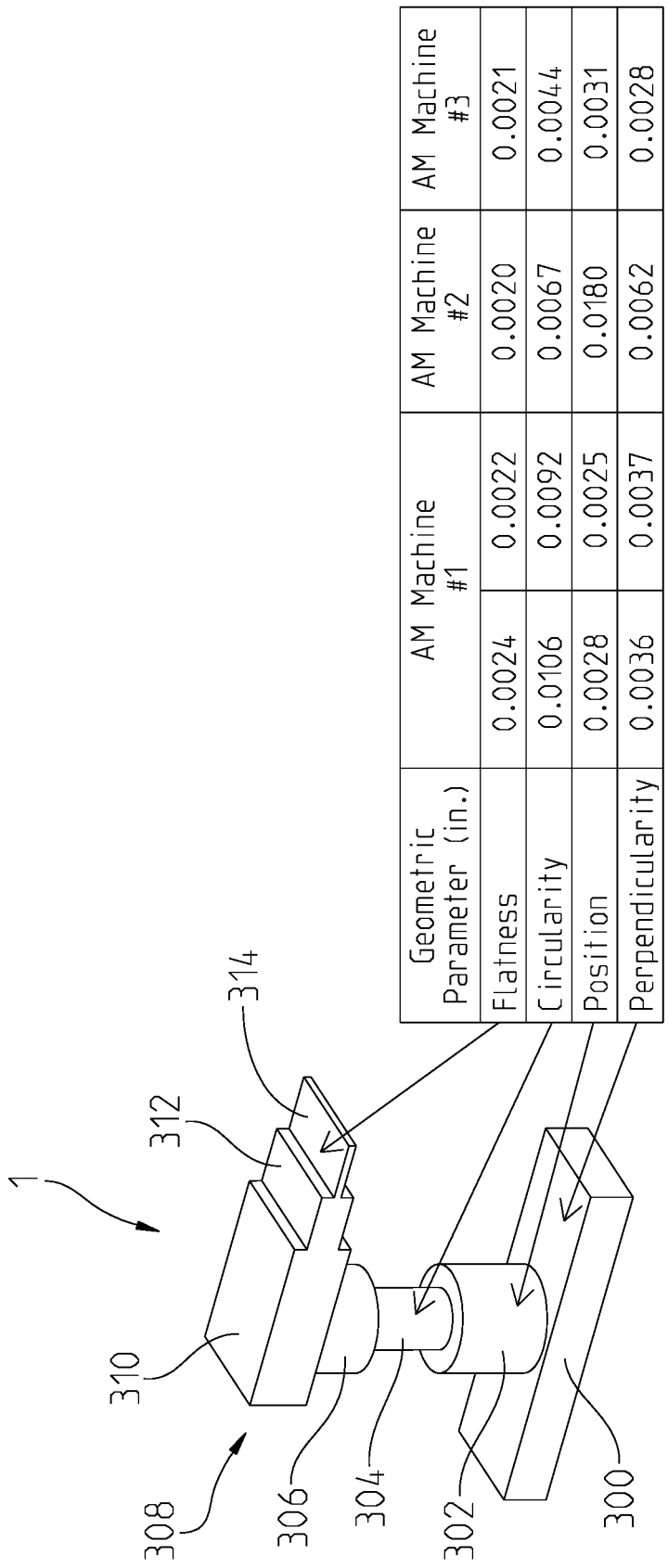
FIG. 10 is an illustrative data file that may be generated from the method steps of FIGS. 8 and 9 for any of the first, second, third, and fourth reference standard articles.

As shown in FIG. 10, the data file created or otherwise obtained by computing device 12 (e.g., by software 16) for each reference standard article 1, 3, 5, 7 may include columns providing the measured parameters for each reference standard article 1, 3, 5, 7 formed by a plurality of AM machines. In one embodiment, three AM machines (AM Machine #1, AM Machine #2, AM Machine #3) may be evaluated and a single data chart (as shown in FIG. 10) may be provided to an operator and/or computing device 12 to compare the calibration accuracy of each of several AM machines. Illustratively, first reference standard article 1 may be created by three different AM machines (AM Machine #1, AM Machine #2, AM Machine #3) and the output of the measured parameters for at least flatness, circularity, position, and perpendicularity may be compared for each AM machine. For example, the measured configuration of upper portion 308 may determine if AM machine 14 is properly calibrated with respect to at least flatness of the GD&T parameters. Additionally, the measured configuration of at least support portion 304 may determine if AM machine 14 is properly calibrated with respect to at least circularlity of the GD&T parameters. Also, the measured configuration of support portion 302 may determine if AM machine 14 is properly calibrated with respect to at least position of the GD&T parameters. Additionally, the measured configuration of base 300 may determine if AM machine 14 is properly calibrated with respect to at least perpendicularity of the GD&T parameters.

The present disclosure provides a direct and observable calibration process that can be extrapolated for different types of AM technology which allows the calibration accuracies of one or more AM machines 14 to be evaluated for the total geometry of a component (i.e., all 14 GD&T parameters plus form, fit, and function of the component) through the formation of only four different references standard articles 1, 3, 5, 7. In this way, a single operation of AM machine 14 can produce reference standard articles 1, 3, 5, 7 to allow evaluation of all 14 GD&T parameters for one or more AM machines 14.

Although the invention has been described in detail with reference to certain preferred embodiments, variations and modifications exist within the spirit and scope of the invention as described and defined in the following claims.

The invention claimed is:

1. A system for determining the calibrated accuracy of a first additive manufacturing (AM) machine and a second AM machine, comprising:
   a first build plate of the first AM machine including a plurality of coordinate positions;
   a first print head of the AM machine configured to deposit material at any of the plurality of coordinate positions on the first build plate to form at least one of a first reference standard article at a first coordinate position of the first build plate, a second reference standard article at a second coordinate position of the first build plate, a third reference standard article at a third coordinate position of the first build plate, and a fourth reference standard article at a fourth coordinate position of the first build plate;
   a second build plate of the second AM machine including the plurality of coordinate positions;
   a second print head of the second AM machine configured to deposit material at any of the plurality of coordinate positions on the second build plate to form at least one of the first reference standard article at a first coordinate position of the second build plate, the second reference standard article at a second coordinate position of the second build plate, the third reference standard article at a third coordinate position of the second build plate, and the fourth reference standard article at a fourth coordinate position of the second build plate;
   a computing device operably coupled to the first and second AM machines; and
   an evaluation device operably coupled to the computing device, the evaluation device being configured to measure each surface of any of the first, second, third, and fourth reference standard articles formed by the first AM machine and any of the first, second, third, and fourth reference standard articles formed by the second AM machine, and the computing device being configured to provide an output about the calibrated accuracy of the first and second AM machines based on the measured surfaces of the first, second, third, and fourth reference standard articles formed by the first and second AM machines, and the computing device being configured to provide a comparison output comparing the output about the calibrated accuracy of the first AM machine and the output about the calibrated accuracy of the second AM machine, wherein the computing device uses the comparison output to determine differences between, the first, second, third and fourth reference standard articles formed by the first and second AM machines based the comparison output to calibrate at least the second AM machine to reduce differences between the first and second AM machine outputs.

2. The system of claim 1, wherein the plurality of coordinate positions includes at least nine predetermined and distinct coordinate positions on the build plate.

3. The system of claim 1, wherein the evaluation device is at least one of a laser scanning machine and a coordinate measuring machine.

4. The system of claim 1, wherein the first reference standard article includes a plurality of linear and cylindrical surfaces and the second reference standard article includes a plurality of linear surfaces.

5. The system of claim 1, wherein the third reference standard article includes a plurality of linear and cylindrical surfaces and the fourth reference standard article includes a plurality of cylindrical surfaces.

6. The system of claim 1, wherein the output about the calibrated accuracy of the first and second AM machines includes measurements for fourteen separate geometric dimensioning and tolerancing parameters for each of the first, second, third, and fourth reference standard articles formed by the first and second AM machines.

* * * * *